United States Patent
Olson et al.

(10) Patent No.: US 7,665,615 B2
(45) Date of Patent: Feb. 23, 2010

(54) COMPOSITE ARTICLE HAVING HYDROPHILIC PROPERTIES AND METHOD OF MANUFACTURE

(75) Inventors: Karmin Lorraine Olson, Kansas City, MO (US); Alan Smithies, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 11/241,430

(22) Filed: Sep. 30, 2005

(65) Prior Publication Data

US 2007/0075014 A1    Apr. 5, 2007

(51) Int. Cl.
- B01D 29/00 (2006.01)
- B01D 9/46 (2006.01)
- B01D 71/26 (2006.01)
- A61B 5/103 (2006.01)
- B01D 61/00 (2006.01)

(52) U.S. Cl. ............ 210/490; 210/500.27; 210/500.36; 210/500.28; 427/244

(58) Field of Classification Search .............. 210/490, 210/500.27, 500.23, 500.36, 500.28, 640, 210/635, 650; 95/45–55; 428/212, 304.4; 424/304.4; 623/65, 66; 55/486; 427/244, 427/2.31, 532

See application file for complete search history.

(56) References Cited

U.S. PATENT DOCUMENTS

| | | | |
|---|---|---|---|
| 4,340,479 A | 7/1982 | Pall | |
| 4,443,511 A * | 4/1984 | Worden et al. | 428/198 |
| 4,525,374 A | 6/1985 | Vaillancourt | |
| 4,813,966 A * | 3/1989 | Gilding et al. | 428/304.4 |
| 4,837,055 A * | 6/1989 | Bitter | 427/244 |
| 4,872,982 A * | 10/1989 | Taylor | 210/490 |
| 4,906,423 A | 3/1990 | Frisch | |
| 4,917,793 A | 4/1990 | Pitt et al. | |
| 4,929,357 A * | 5/1990 | Schucker | 210/640 |
| 4,978,451 A | 12/1990 | Taylor | |
| 5,209,850 A | 5/1993 | Abayasekara et al. | |
| 5,317,072 A * | 5/1994 | Bokerman et al. | 528/12 |
| 5,854,603 A * | 12/1998 | Heger | 342/85 |
| 5,935,845 A * | 8/1999 | Koontz | 435/283.1 |
| 5,993,515 A * | 11/1999 | Sirkar | 95/46 |
| 6,045,694 A | 4/2000 | Wang et al. | |
| 6,071,406 A | 6/2000 | Tsou | |
| 6,075,073 A * | 6/2000 | McGlothlin et al. | 523/310 |
| 6,334,881 B1 * | 1/2002 | Giannetta et al. | 55/486 |
| 6,565,782 B1 | 5/2003 | Wang et al. | |
| 6,615,537 B2 * | 9/2003 | Tonkin et al. | 47/58.1 R |
| 6,716,353 B1 * | 4/2004 | Mirzadeh et al. | 210/635 |
| 6,860,393 B2 | 3/2005 | Hou et al. | |
| 6,899,743 B2 * | 5/2005 | Wijmans et al. | 95/50 |
| 7,138,057 B2 * | 11/2006 | Debes et al. | 210/500.36 |
| 7,144,621 B2 * | 12/2006 | Tanaka et al. | 428/212 |
| 7,166,224 B2 * | 1/2007 | Tonkin et al. | 210/640 |
| 7,244,444 B2 * | 7/2007 | Bates | 424/423 |

(Continued)

Primary Examiner—Ana M Fortuna
(74) Attorney, Agent, or Firm—Armstrong Teasdale LLP

(57) ABSTRACT

A composite article includes a base material and a porous membrane laminated with the base material. The porous membrane has hydrophobic properties and includes at least one of expanded polytetrafluoroethylene, woven polytetrafluoroethylene, and non woven polytetrafluoroethylene. A coating layer is formed on at least a portion of the porous membrane. The coating layer has hydrophilic properties and includes at least one of an organofunctional siloxane and a polyether urethane polymer.

21 Claims, 4 Drawing Sheets

U.S. PATENT DOCUMENTS 7,381,331 B2 *  6/2008  Duong et al. .......... 210/500.42
7,584,860 B2 *  9/2009  Olson ........................ 210/490

2005/0191426 A1  9/2005  Moya

* cited by examiner

COMPOSITE ARTICLE HAVING HYDROPHILIC PROPERTIES AND METHOD OF MANUFACTURE

BACKGROUND OF THE INVENTION

This invention relates generally to composite articles, and more particularly to porous membranes having hydrophilic properties.

Fluoropolymers have excellent chemical and heat resistance properties and in general, are hydrophobic. Expanded porous polytetrafluoroethylene (ePTFE) polymer membranes can be used as filter media for liquid filtration. However, because of the hydrophobicity of fluoropolymers, aqueous dispersions cannot readily be filtered through filters made from these fluoropolymers. Such ePTFE filters can be pre-wetted with organic solvents and then flushed with water to overcome the lack of affinity between the hydrophobic material and the polar aqueous dispersion. However, pre-wetting may be expensive and may lead to "gas-lock" or "dewetting."

Accordingly, there have been various attempts to make fluoropolymer membranes more hydrophilic and therefore more receptive to wetting with water while maintaining predetermined properties. Some known methods for making fluoropolymer membranes more hydrophilic include coating a surface of the membrane and the interior of pores of the membrane, with a hydrophilic coating, such as a fluorinated surfactant. However, because the fluoro-surfactant is bound to the membrane only by chemical affinity, the fluoro-surfactant may be inadvertently washed out by the aqueous medium, and as such, the fluoropolymer membrane may therefore lose its water-wettability. Other known methods for making fluoropolymer membranes more hydrophilic include cross-linking a fluoro-surfactant using a radiation beam such as Gamma ray, electron beam, or non-equilibrium plasma. Such cross-linking may not diffuse out the fluoropolymer membrane by the aqueous flow, however the radiation may weaken the mechanical strength of the fluoropolymer membrane. Moreover, the fluoro-surfactant may be adversely effected by the radiation, for example, through deterioration of the fluoro-surfactant and/or alteration of the fluoro-surfactants chemical properties.

Moreover, hydrophilic coatings are sometimes applied to the membrane before the membrane is laminated with a base material or substrate, such as a felt or a woven fabric. However, heat from some lamination processes that bond the membrane to the base material may damage the hydrophilic coating. Furthermore, some membranes may not be strong enough to receive the hydrophilic coating. For example, a weight of fluid filtration membranes may cause the membrane to be damaged by application of the hydrophilic coating, possibly reducing the effectiveness and/or the lifespan of the membrane.

BRIEF DESCRIPTION OF THE INVENTION

In one aspect, a composite article includes a base material and a porous membrane laminated with the base material. The porous membrane has hydrophobic properties and includes at least one of expanded polytetrafluoroethylene, woven polytetrafluoroethylene, and non woven polytetrafluoroethylene. A coating layer is formed on at least a portion of the porous membrane. The coating layer has hydrophilic properties and includes at least one of an organofunctional siloxane and a polyether urethane polymer.

In another aspect, a method is provided of making a composite article having hydrophilic properties. The method includes providing a base material, providing a porous membrane having hydrophobic properties and comprising a plurality of pores, laminating the base material with the porous membrane, and applying a coating of a coating composition having hydrophilic properties onto surfaces defining the pores in the porous membrane after the porous membrane has been laminated with the base material.

DETAILED DESCRIPTION OF THE INVENTION

Figure 1:
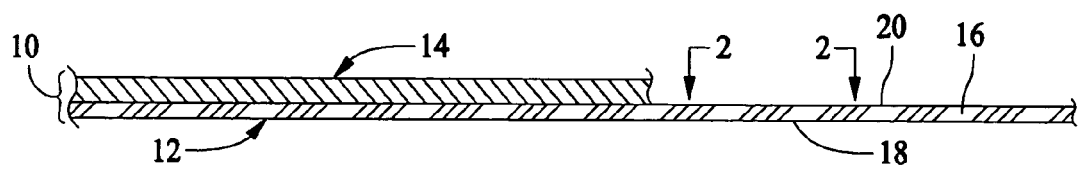
FIG. 1 is a schematic sectional view of an exemplary embodiment of a composite article.

FIG. 1 is a schematic sectional view of an exemplary embodiment of a composite article 12. Composite article 12 can be used, but is not limited to being used, as filter media. Although composite article 12 may be used to filter anything, in some embodiments composite article 12 is used for liquid filtration, such as, but not limited to, aqueous liquids. For example, in some embodiments composite article 12 is used to filter a brine solution. Composite article 12 is generally hydrophilic such that it generally retains water wetability and can be dried and subsequently flow water with no special pre-wetting procedures. The term "hydrophilic" is used herein to describe the compatibility of a material with aqueous solutions and other polar solvents, or, in other words, the ability of a material to permit aqueous solutions and other polar solvents to wet out and pass through the material.

Composite article 12 generally includes a base material 14 laminated with a porous membrane 16. Base material 14 may be any type of material that meets performance and/or other criteria established for a predetermined application in which composite article 12 will be used. For example, in some embodiments base material 14 includes polypropylene, polyethylene, polyester, acrylic, polyphenylene sulfide (PPS), aramid, polyimide, glass, and/or polytetrafluoroethylene (PTFE). Although base material 14 may be formed in other ways, base material 14 may be woven material and/or non-woven material, such as but not limited to, needle felt, spunbond, extruded mesh, dry-lattice, cast film, and/or hydroengtangled materials. In some embodiments, and for example, base material 14 may be formed using heat, compression, and/or chemical treatment.

Figure 2:
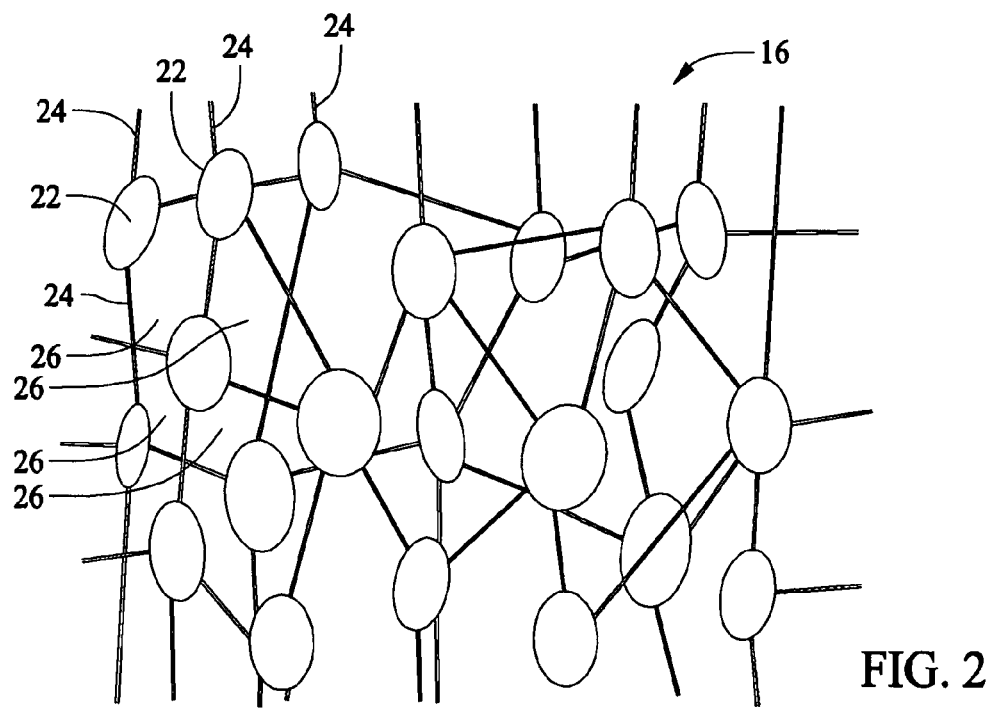
FIG. 2 is an enlarged schematic plan view of a portion of the exemplary composite article shown in FIG. 1.

FIG. 2 is an enlarged schematic plan view of a portion of composite article 12. Membrane 16 is porous, and in some embodiments microporous, with a three-dimensional matrix or lattice type structure of a plurality of nodes 22 interconnected by a plurality of fibrils 24. Membrane 16 is made from any suitable material, such as, but not limited to, expanded polytetrafluoroethylene (ePTFE) and/or a PTFE fabric. For example, membrane 16, in one exemplary embodiment, is made by extruding a mixture of polytetrafluoroethylene (PTFE) fine powder particles (e.g., available from DuPont of Wilmington, Del. under the name TEFLON® fine powder resin) and lubricant. The extrudate is then calendared. The calendared extrudate is then "expanded" or stretched in at least one direction to form fibrils 24 connecting nodes 22 in a three-dimensional matrix or lattice type of structure. "Expanded" is intended to mean sufficiently stretched beyond the elastic limit of the material to introduce permanent set or elongation to fibrils 24. Membrane 16, in one exemplary embodiment, is heated or "sintered" to reduce and minimize residual stress in the ePTFE material. However, in alternate embodiments, membrane 16 is unsintered or partially sintered as is appropriate for the contemplated use of membrane 16. In some embodiments, the size of a fibril 24 that has been at least partially sintered is in the range of between about 0.05 micron and about 0.5 microns in diameter, taken in a direction normal to the longitudinal extent of fibril 24.

Other materials and methods can be used to form a suitable membrane 16 that has an open pore structure. For example, other suitable materials include, but are not limited to, polyolefin, polyamide, polyester, polysulfone, polyether, acrylic and methacrylic polymers, polystyrene, polyurethane, polypropylene, polyethylene, cellulosic polymer and combinations thereof. Other suitable methods of making a porous membrane 16 include, but are not limited to, foaming, skiving, or casting any of the suitable materials.

Surfaces of nodes 22 and fibrils 24 define numerous interconnecting pores 26 that extend completely through membrane 16 between opposite major side surfaces 18 and 20 (shown in FIG. 1) of membrane 16 in a tortuous path. In some embodiments, the average size of pores 26 in membrane 16 is sufficient to be deemed microporous, but any pore size can be used. In one exemplary embodiment, a suitable average size for pores 26 in membrane 16 is between about 0.01 microns and about 10 microns, and in other embodiments between about 0.1 microns to about 5.0 microns.

Although membrane 16 may have any weight, in some embodiments membrane 16 has a weight of between about 0.05 and about 1 ounce per square yard. For example, in some embodiments membrane 16 has a weight of between about 0.1 and about 0.5 ounces per square yard.

Membrane 16 is generally hydrophobic, which is intended to mean that some liquids, such as, but not limited to, some aqueous liquids and other polar solvents, are incompatible with the material of membrane 16 such that the liquids do not wet out and pass through membrane 16 via membrane pores 26. Accordingly, membrane 16 may not allow flow of such incompatible liquids therethrough, and therefore may not be suitable for filtration of such incompatible liquids.

To describe what is meant by the "compatibility" of liquids and membrane 16, the concept of a liquid drop "wetting" a solid material will be briefly described. The physical and thermodynamic definition of "wetting" is based on the concepts of surface energy and surface tension. Liquid molecules are attracted to one another at their surfaces. This attraction tends to pull the liquid molecules together. Relatively high values of surface tension mean that the molecules have a strong attraction to one another and it is relatively more difficult to separate the molecules. The attraction varies depending on the type of molecule. For example, water has a relatively high surface tension value because the attraction in water molecules is relatively high due to hydrogen bonding, while some oils have relatively low surface tension values.

The concept of "wetting" is a function of the surface energy of a liquid ($'Y_{SL}$), the surface energy of a solid ($'Y_{SA}$) and the surface tension of a liquid ($\Upsilon_{LA}$), and is often described by the Young-Dupre equation below.

$$'Y_{SL} - Y_{SA} = \Upsilon_{LA} * \cos(\theta) \quad (1)$$

Contact angle θ is a measure of the angle defined between the surface of a liquid drop and the surface of a solid taken at the tangent edge of where the liquid drop contacts the solid, such that when the contact angle θ is about 0°, a liquid will spread to a thin film over the solid surface. By comparison, a solid and liquid combination with a contact angle θ of about 180° causes the liquid to form a spherical drop on the solid surface. When a contact angle θ between about 0° and about 90° exists, a liquid will "wet" the solid it is contacting and the liquid will be drawn into pores, if any, existing in the surface of a solid. When the contact angle θ is more than about 90°, a liquid will not wet the solid and there will be a force needed to drive the liquid into any existing pores in the solid.

Membrane 16 contains many interconnected pores 26 that fluidly communicate with environments adjacent to opposite facing side surfaces 18 and 20. Therefore, the propensity of membrane 16 to permit a liquid material to wet out membrane 16 and pass through membrane pores 26, or, in other words, the compatibility of membrane 16 and the liquid, is a function of the surface energy of membrane 16, the surface tension of the liquid, the relative contact angle between membrane 16 and the liquid, and/or the size and/or effective flow area of membrane pores 26. One way to provide membrane 16 compatible with a liquid, is to provide membrane 16 with a surface tension and/or energy greater than the liquid, and a relative contact angle of between about 0° and about 90°. Surface energy and surface tension values are typically given in units of dynes/cm. Examples of surface energies and relative surface tensions are listed in the table below:

| Material | Surface Energy (dynes/cm) | Surface Tension (dynes/cm) |
| --- | --- | --- |
| ePTFE | 30 | |
| Deionized water | | 72 |
| tap water | | varies with source |
| Acetone | | 23.5 |
| Isopropyl alcohol (100%) | | 20.9 |
| Ammonium Hydroxide (10%–30% Ammonia) | | 62 |

The more that the surface tension and/or energy of membrane 16 is above the surface tension of a particular liquid, and/or the more the relative contact angle is between about 0° and about 90°, the more likely the liquid will wet out membrane 16 and pass through membrane pores 26.

Figure 3:
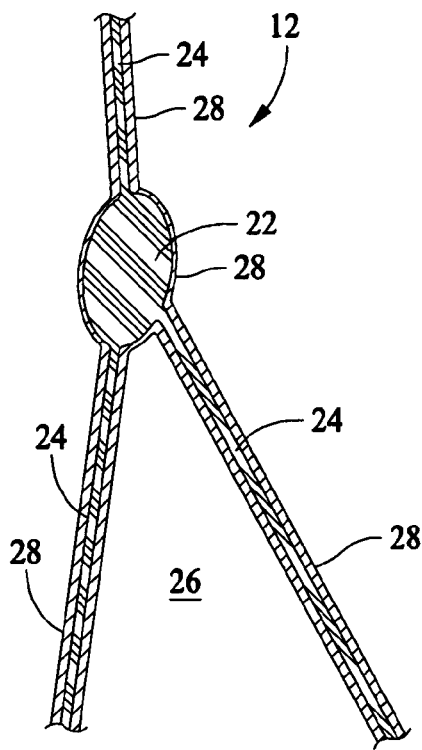
FIG. 3 is an enlarged schematic sectional view of a portion of the exemplary composite article shown in FIG. 1 illustrating a coating layer formed on a membrane of the exemplary composite article.

FIG. 3 is an enlarged schematic sectional view of a portion of composite article 12 illustrating a coating layer 28 formed on membrane 16. Coating layer 28 is a hydrophilic coating that may enhance hydrophilic properties of membrane 16. For example, coating layer 28 may increase the surface tension and/or energy of membrane 16 so at least some aqueous solutions and/or other polar solvents are capable of wetting membrane 16 and passing through membrane pores 26. Selecting a coating layer 28 with a predetermined surface energy and/or tension may therefore allow selective flow through membrane 16, and therefore composite article 12, of some aqueous solutions and/or other polar solvents. Moreover, coating layer 28 may provide a relative contact angle between membrane 16 and some aqueous solutions and/or other polar solvents of between about 0° and about 90°.

Coating layer 28 includes coalesced solids having hydrophilic properties. Although coating layer 28 may include other hydrophilic solids, in some embodiments coating layer 28 is formed from a coating composition including organofunctional siloxane solids and/or polyether urethane polymer solids. For example, the hydrophilic solids used in coating layer 28 are, in some embodiments, in the form of a dispersion of organofunctional siloxane solids, such as, but not limited to, dispersions of ECM/D6455 Hydrophilic Coating in Acetone, available from Whitford Corporation of Frazer, Pa., and/or ECM/D6453 Hydrophilic Coating, IPA, also available from Whitford Corporation. Also by way of example, in some embodiments the hydrophilic solids used in coating layer 28 are in the form of polyether urethane polymer solids, such as, but not limited to, Permax® 200, available from Noveon, Inc. of Cleveland, Ohio.

The hydrophilic solids are diluted in one or more suitable solvents to form the coating composition that will form coating layer 28. Although other solvents may be used, suitable solvents may include, but are not limited to, water, ethanol, isopropyl alcohol (IPA), acetone, methanol, n-propanol, n-butanol, N-N-dimethylformamide, methyl ethyl ketone and water soluble e- and p-series glycol ethers. Moreover, although the solvents may have other surface tensions, in some embodiments, the coating composition includes a solvent having a surface tension of less than about 31 dynes per centimeter. In some embodiments, a dispersion of hydrophilic solids and solvent is stabilized with a stabilizing agent, such as, but not limited to, deionized and/or demineralized water, to form the coating composition that will form coating layer 28. The stabilizing agent reduces the propensity of the hydrophilic solids from settling out and agglomerating to a size which cannot enter a pore 26 in membrane 16. Moreover, in some embodiments, to form the coating composition that will form coating layer 28, a dispersion of hydrophilic solids and solvent is mixed with a hydrophilic activator, such as, but not limited to, ammonium hydroxide.

Although the coating composition may include other amounts, in some embodiments, the coating composition forming coating layer 28 includes an amount of hydrophilic solids in the range of about 0.1 wt % to about 10 wt % based on a total weight of the coating composition. For example, in some embodiments, the coating composition includes hydrophilic solids in the range of about 1.0 wt % to about 3.0 wt %. One example of an embodiment of a coating composition used to form coating layer 28 includes organofunctional siloxane solids in the range of about 1.0 wt % to about 2.0 wt %. Another example of an embodiment of a coating composition used to form coating layer 28 includes polyether urethane polymer solids in the range of about 2.0 wt % to about 3.0 wt %. Although the coating composition may include other amounts of solvents, in some embodiments, the coating composition that forms coating layer 28 includes an amount of solvents in the range of about 40 wt % to about 99.9 wt %, including water and/or other solvents. In some embodiments, and for example, the coating composition includes an amount of solvents, other than water, in the range of about 50 wt % to about 75 wt %.

Although the coating composition may include other amounts of stabilizing agent, in some embodiments the coating composition forming coating layer 28 includes an amount of stabilizing agent in the range of about 5 wt % to 50 wt %. For example, in some embodiments the coating composition includes an amount of stabilizing agent in the range of about 15 wt % to about 25 wt %. Moreover, although the coating composition may include other amounts of hydrophilic activator, in some embodiments the coating composition forming coating layer 28 includes an amount of hydrophilic activator in the range of about 0.1 wt % to about 1.0 wt %. For example, in some embodiments the coating composition includes an amount of hydrophilic activator in the range of about 0.15 wt % to about 0.35 wt %.

One example of an embodiment of making a coating composition that will be applied to membrane 16 to form coating layer 28 includes providing a dispersion of organofunctional siloxane solids and solvent, such as, but not limited to, ECM/D6455 Hydrophilic Coating in Acetone (a mixture of a solution of about 100% acetone by volume with about 6% organofunctional siloxane solids) and/or ECM/D6453 (a mixture of a solution of about 100% IPA by volume with about 6% organofunctional siloxane solids). The dispersion of organofunctional siloxane solids is then diluted about 1:1 with a hydrophilic activator solution of about 98% IPA, about 1% water, and about 1% ammonium hydroxide (such as, but not limited to, greater than 25% as ammonia) by volume. The diluted dispersion is then further diluted about 1:1 with IPA to form a coating composition having about 1.5 wt % organofunctional siloxane solids. Of course, the coating composition described herein is not limited to the coating composition, or the method of making the coating composition, described in this paragraph. Rather, the coating composition described in this paragraph and the method of making such coating composition are exemplary only.

Another example of an embodiment of making a coating composition that will be applied to membrane 16 to form coating layer 28 includes providing polyether urethane polymer solids, such as, but not limited to, Permax® 200, which is about 35% solids. The polyether urethane polymer solids are diluted about 5:95 with water to form a coating composition having about 2.5% solids. Of course, the coating composition described herein is not limited to the coating composition, or the method of making the coating composition, described in this paragraph. Rather, the coating composition described in this paragraph and the method of making such coating composition are exemplary only.

In some embodiments, the coating composition that forms coating layer 28 is generally compatible with membrane 16 such that the coating composition will pass through membrane pores 26 and "wet-out" surfaces of membrane 16 to form a continuous, conformal coating layer 28. For example, the coating composition has a surface tension and a relative contact angle that enable the coating composition to wet membrane 16 such that membrane surfaces, including surfaces of membrane pores 26, are coated with the hydrophilic solids in the coating composition. However, in some embodiments, membrane 16 is wet with a solution containing a solvent before the coating composition is applied to membrane 16 such that the coating composition will pass through membrane pores 26 and "wet-out" surfaces of membrane 16. For example, in some embodiments wherein the coating composition includes polyether urethane polymer solids, a solution of about 75% IPA and about 25% water by volume is applied to membrane 16 before applying the coating composition. In some embodiments, a stabilizing agent and/or solvent is used to dilute "as purchased" hydrophilic solids to a dispersion having a predetermined solids content. It may be desirable to increase a ratio of the stabilizing agent to solvent to increase a stability of the coating composition. However, enough solvent must be present to ensure wetting of membrane 16 and flow of the coating composition into membrane pores 26.

Generally, and as will be described in more detail below, the coating composition is applied to membrane 16 to wet the surfaces of nodes 22 and fibrils 24 that define membrane pores 26, as well as side surfaces 18 and/or 20. The thickness of coating layer 28 and the amount and type of hydrophilic solids in coating layer 28 may depend on several factors. These factors include the affinity of the solids to adhere and conform to the surfaces of nodes 22 and fibrils 24 that define membrane pores 26, the final solids content within the coating composition, the coating process, and/or whether abuse of membrane 16 during preparation of composite article 12 for use, during use, and/or during maintenance (such as, but not limited to, removal of captured particles) may crack, dislodge, damage or disrupt coating layer 28.

The coating composition is applied to membrane 16 such that substantially all of the surfaces of the nodes 22 and fibrils 24, as well as surfaces 18 and 20, are at least partially wetted and membrane pores 26 are not blocked. The coating composition adheres and conforms to the surfaces of nodes 22 and fibrils 24 that define membrane pores 26, in addition to surfaces 18 and/or 20. It is not necessary that the coating composition completely encapsulate the entire surface of a node 22 or fibril 24 (or of surfaces 18 and/or 20) or be continuous to increase hydrophilicity of membrane 16, and therefore composite article 12. The coating composition is then cured by heating membrane 16 such that the hydrophilic solids flow and coalesce, and such that the stabilizing agents and solvents are removed. During the application of heat, the thermal mobility of the hydrophilic solids allows the solids to be mobile and flow around, engage, and adhere to surfaces 18 and/or 20, nodes 22, and fibrils 24, and therefore coalesce to form coating layer 28. The finished coating layer 28 results from coalescing the hydrophilic solids on as many of the surfaces of nodes 22 and fibrils 24 defining membrane pores 26, as well as surfaces 18 and/or 20, as possible.

Figure 4:
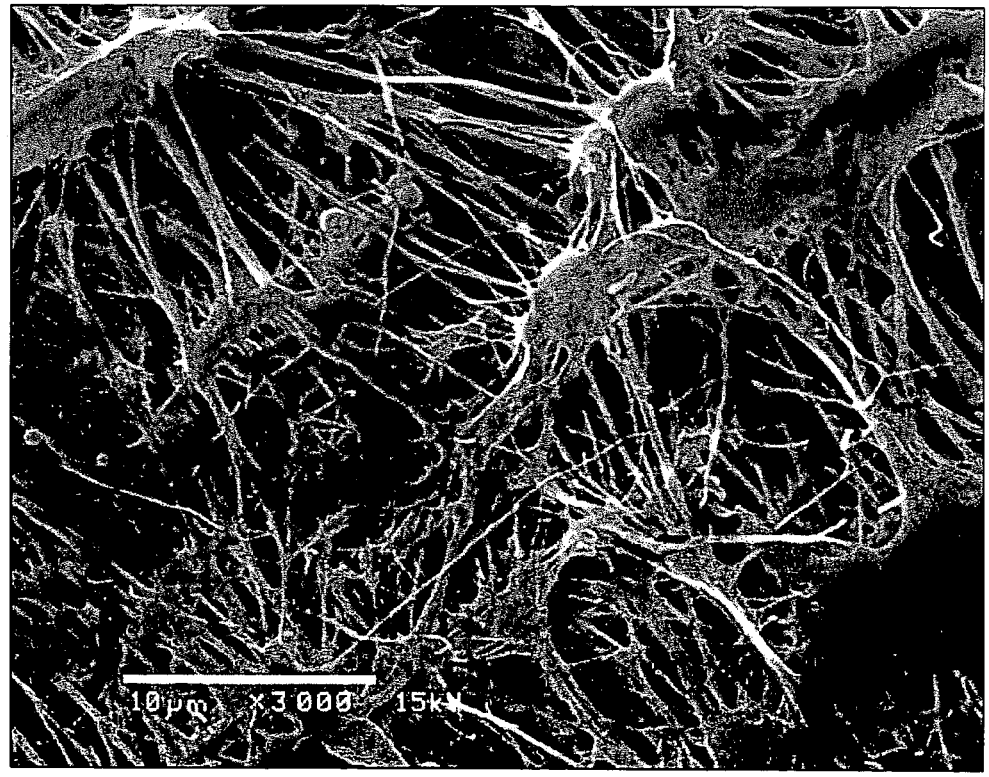
FIG. 4 is a scanning electron microscope (SEM) photomicrograph of a portion of the porous membrane of the exemplary composite article shown in FIG. 1.

FIG. 4 is a scanning electron microscope (SEM) photomicrograph of a portion of membrane 16 having coating layer 28 thereon. The coalesced hydrophilic solids provide a coating layer 28 that improves hydrophilic properties of membrane 16 but does not completely block or "blind" membrane pores 26, which could adversely affect liquid permeability through composite article 12. It can be seen from FIG. 4 that membrane pores 26 are not completely blocked. It will be apparent that some pores 26 in membrane 16 could be blocked, but such blockage is minimal and dependent on variables in the coating process and structure of membrane 16. Coating layer 28, thus, may improve or modify the hydrophilicity of the material of membrane 16 such that membrane 16 allows some liquids to wet out and pass through membrane 16, and therefore composite article 12. For example, coating layer 28 increases a surface tension and/or energy of membrane 16 to provide membrane 16 with a surface tension that is greater than some liquids, and a relative contact angle of between about 0° and about 90°.

In some embodiments, composite article 12 is liquid permeable to a sufficient degree for filtration of liquid, such as, but not limited to, filtration of aqueous liquids. Although composite article 12 may have other water permeabilities, in some embodiments, composite article 12 has a water permeability of between about 5 and about 60 milliliters per minute per square centimeter at about 27 inches of mercury vacuum, and in other embodiments, of between about 45 and about 55 milliliters per minute per square centimeter.

In some embodiments, membrane 16, and therefore composite article 12, generally retains water wetability and can be dried and subsequently flow liquid with no special pre-wetting procedures. More specifically, in some embodiments membrane 16, and therefore composite article 12, has a water permeability of at least about 5 milliliters per minute per square centimeter at about 27 inches of mercury vacuum after at least 3 wet then dry cycles. In some embodiments, membrane 16, and therefore composite article 12, has a water permeability of at least about 5 milliliters per minute per square centimeter at about 27 inches of mercury vacuum after at least 10 wet then dry cycles. Moreover, in some embodiments membrane 16, and therefore composite article 12, has a water permeability of at least about 25 milliliters per minute per square centimeter at about 27 inches of mercury vacuum after at least 10 wet then dry cycles.

Although composite article 12 may have other air permeabilities, in some embodiments composite article 12 has an air permeability of at between about 0.01 and about 10 cubic feet per minute (CFM) per square foot of membrane 16, and in other embodiments, between about 0.75 and about 2.25 CFM per square foot of membrane 16, as measured by ASTM D737 testing.

Figure 5:
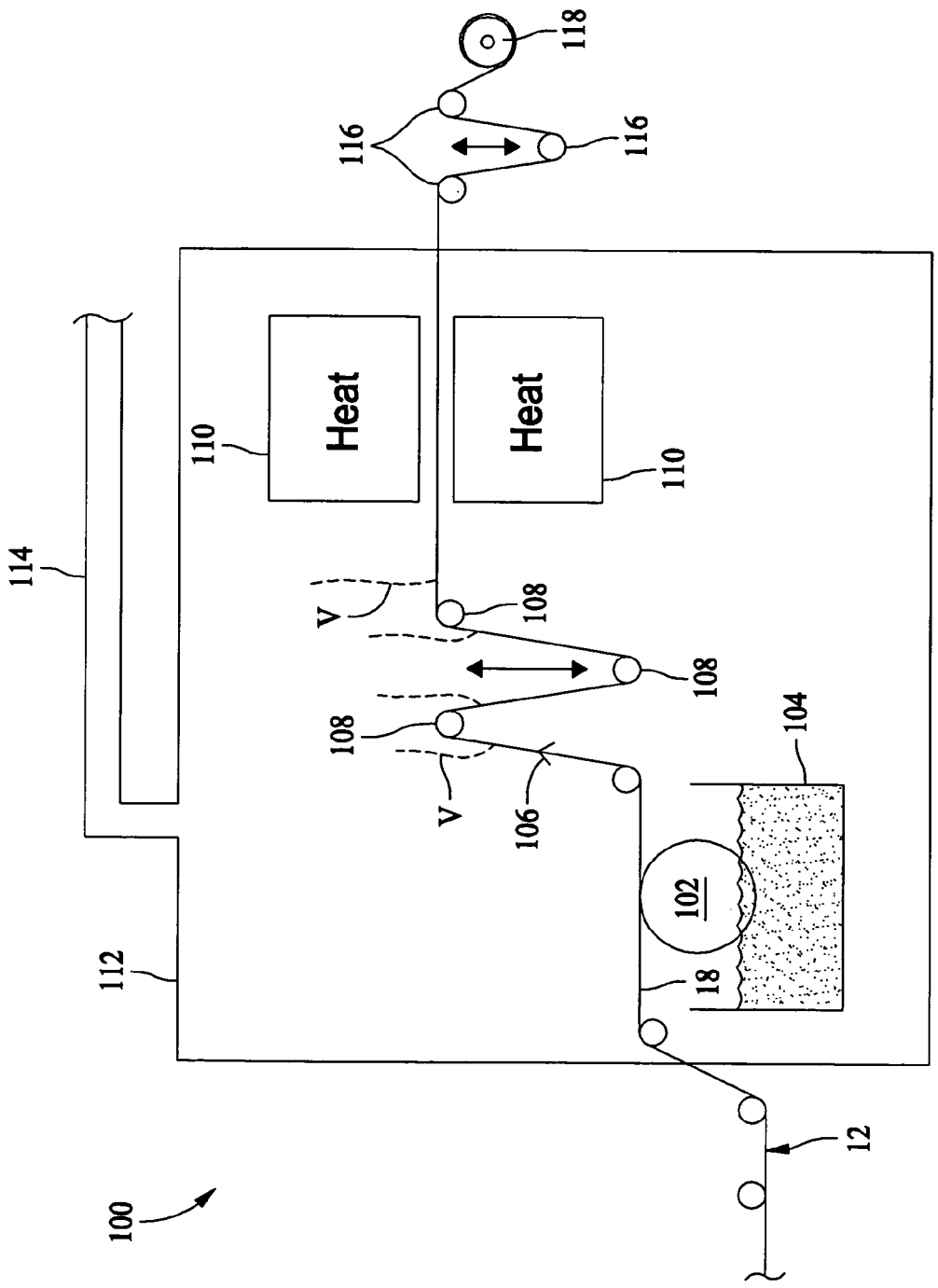
FIG. 5 is a schematic view of an exemplary embodiment of a system for fabricating the exemplary composite article shown in FIG. 1.

FIG. 5 is a schematic view of an exemplary embodiment of a system 100 for fabricating a composite article, such as composite article 12. Some known composite articles are fabricated by applying a hydrophilic coating to the membrane before the membrane is laminated with a base material. However, depending on a temperature resistance of the hydrophilic coating, heat from some lamination processes that bond the membrane to the base material may damage the hydrophilic coating, possibly reducing the hydrophilic properties of the coating and therefore the composite article. For example, lamination temperatures above 300° F. may damage some hydrophilic coatings. Moreover, some membranes may not be durable enough to receive the hydrophilic coating without being supported by the base material, possibly reducing the effectiveness and/or the lifespan of the membrane. For example, a weight, such as, but not limited to, between about 0.05 and about 1 ounce per square yard, of some liquid filtration membranes may be insufficient to prevent the membrane from being damaged by application of the hydrophilic coating.

Accordingly, to support membrane 16 during application of the coating composition, and to prevent coating layer 28 from being damaged from lamination temperatures, composite article 12 is fabricated by laminating base material 14 with membrane 16 before coating layer 28 is formed by application of the coating composition. Moreover, because membrane 16 and base material 14 are laminated together before the coating composition is applied to membrane 16, some of the coating composition may wet portions of base material 14 and thereby possibly improve hydrophilic properties of base material 14, as will be described in more detail below.

Although base material 14 may be laminated against side surface 18, in the exemplary embodiment base material 14 is laminated against membrane side surface 20. Base material 14 and membrane 16 may be laminated together using any suitable process, any suitable parameters, and using any suitable means. For example, and although base material 14 and membrane 16 may be laminated together at any temperature, in some embodiments, base material 14 and membrane 16 are laminated together using heat at a temperature of greater than about 300° F. In one exemplary embodiment, base material 14 and membrane 16 are laminated together at a temperature of between about 680° F. and about 700° F. For example, in some embodiments wherein base material 14 is ePTFE, base material 14 and membrane 16 are laminated together using heat at a temperature of about 690° F. However, in some embodiments base material 14 and membrane 16 are laminated together using heat at a temperature of less than about 300° F. For example, in some embodiments wherein base material 14 is polyethylene, base material 14 and membrane 16 are laminated together using heat at a temperature of about 250° F. In some embodiments, and for example, base material 14 and membrane 16 are laminated together using an adhesive applied between membrane 16 and base material 14.

The coating composition can be applied to membrane 16 using any suitable process, such as, but not limited to, roll-coating, immersion (dipping), and/or spraying. In the exemplary embodiment, to apply the coating composition that forms coating layer 28, the laminated base material 14 and membrane 16 are directed over a roller 102 that is immersed within a reservoir 104 containing the coating composition. Specifically, composite article 12 is directed over roller 102 such that membrane side surface 18 contacts roller 102. Coating composition on roller 102 is thereby applied to membrane surface 18. As composite article 12 is directed over roller 102, base material 14 supports membrane 16 to facilitate preventing damage to membrane 16 from roller 102 and/or other components of system 100, whether described and/or illustrated herein. The coating composition impregnates membrane 16, wets the surfaces of the nodes 22 and fibrils 24 that define membrane pores 26, and wets surfaces 18 and 20.

As described above, in some embodiments the coating composition may also spread into base material 14 to thereby wet base material 14 and possibly improve hydrophilic properties of base material 14, and therefore composite article 12. If an adhesive is used to laminate base material 14 and membrane 16 together, the adhesive may facilitate such spreading into base material 14 and thereby facilitate improving the hydrophilic properties of base material 14, and therefore composite article 12. However, the adhesive may sometimes not facilitate improving hydrophilic properties of base material 14. Accordingly, if the adhesive is not needed to bond base material 14 and membrane 16, an amount of adhesive used may be reduced or eliminated entirely as an extra component of composite article 12. Moreover, the adhesive may sometimes inhibit the improvement of hydrophilic properties of base material 14, for example, by at least partially blocking the coating composition from spreading into base material 14. When the adhesive inhibits improvement of hydrophilic properties of base material 14, an amount of adhesive used for lamination may sometimes be reduced or eliminated entirely to, for example, allow the coating composition to spread into and wet base material 14. For example, in some embodiments wherein base material 14 is ePTFE, adhesive may not facilitate improving hydrophilic properties of base material 14 and may therefore not be included in the lamination process. One example of a base material 14 wherein adhesive may facilitate spreading of the coating composition into base material 14, and thereby facilitate improving hydrophilic properties of base material 14, is polypropylene.

Composite article 12 is directed off of roller 102 and a mechanism 106, such as, but not limited to, a pair of squeegees or doctor blades, engages composite article 12. Mechanism 106 facilitates spreading the coating composition and removing excess coating composition from composite article 12 to minimize the chance of blocking membrane pores 26. Any other suitable means for removing the excess coating composition may be used, such as, but not limited to, an air knife. Composite article 12 is then directed over rollers 108'. The stabilizing agents, solvents, and/or any other fugitive materials are removed by air drying or other drying methods. The solvents typically evaporate by themselves but the evaporation can be accelerated by applying relatively low heat, such as, but not limited to, at least to about 212° F. Solvent vapor V generally moves away from composite article 12, as shown in FIG. 5. Removal of the stabilizing agents may require an affirmative step for drying, such as the application of heat.

Composite article is directed from rollers 108 to an oven having heat sources 110. In some embodiments, the reservoir 104 and heat sources 110 may be enclosed or vented with a hood 112. Hood 112 may be vented to a predetermined location through a conduit 114. Hood 112 removes and captures vapor V, such as, fugitive solvents and stabilizing agents, from composite article 12 and directs the captured material to the predetermined location for storage or disposal. In some embodiments, heat sources 110 each include two heating zones (not shown). The first heating zone would be a "drying zone" to apply relatively low heat to composite article 12, such as, but not limited to, about 212° F., to remove or evaporate any fugitive solvents and stabilizing agents that have not yet evaporated. The second heating zone would be a "curing zone" to coalesce the hydrophilic solids.

Heat sources 110, in the second heating zone if two are included, apply a temperature of equal to or less than about 300° F. for at least 10 seconds to cure the coating composition on composite article 12 and thereby form coating layer 28. In some embodiments, heat sources 110 apply heat in the range of about 260° F. to about 280° F. In other embodiments, heat sources 110 apply heat in the range of about 220° F. to about 240° F. Moreover, in some embodiments, heat sources 110 apply heat to composite article 12 for between about 30 seconds and about 5 minutes. For example, in some embodiments heat sources 110 apply heat to composite article 12 for about 2 minutes. It should be understood that the temperature and duration of curing by heat sources 110 may depend on the selected coating composition and/or the selected materials of membrane 16 and/or base material 14. In some embodiments, curing composite article 12 at a temperature equal to or lower than 300° F. facilitates preventing damage to membrane 16 that my affect a liquid permeability of composite article 12. For example, a temperature greater than 300° F. may shift membrane pores 26 such that they are blocked. The heat applied to composite article 12 permits the hydrophilic solids to reduce their surface tension to flow and spontaneously wet and better coat surfaces defining nodes 22 and fibrils 24, as well as membrane surfaces 18 and 20. The hydrophilic solids flow and coalesce around such surfaces to render composite article 12 hydrophilic. Once cured, composite article 12 exits the oven and is directed over rollers 116 onto a take up reel 118.

Test Descriptions:

Wetting Test

A liquid, such as water, is sprayed or dropped onto the surface of a sample of test material to visually assess the wet state and the extent of infiltration of the liquid into the material. When wetted and penetrated by the test liquid, the samples generally change in appearance from opaque or semi-transparent to transparent.

Water Permeability Test

Water Permeability is measured using a vacuum filtration apparatus. The time for a measured volume of water to flow through a given surface area of a test material at a predetermined pressure is recorded, and the flow rate is calculated therefrom.

Air Permeability Test

Air permeability is measured by a Frazier Air Permeability Tester per ASTM D737 or on a Textest FX 3300 Air Permeability Tester.

Without intending to limit the scope of the methods and articles described and/or illustrated herein, the following examples demonstrate how embodiments of the articles and methods described and/or illustrated herein may be practiced. Test results are provided below to demonstrate the experiments performed and the methodology used.

MEMBRANE EXAMPLE

A microporous membrane made from ePTFE material was used. The membrane had an average pore size in the range of about 0.35 to 1.0 micron.

TREATMENT EXAMPLE 1

The membrane described above was laminated with a polypropylene material and treated with a diluted and activated dispersion of ECM/D6455 to form a composite article. Specifically, a organofunctional siloxane solids dispersion (ECM/D6455, a mixture of about 100% acetone by volume with about 6% organofunctional siloxane solids) was mixed with a hydrophilic activator and IPA to form a coating composition having 1.5 wt % organofunctional siloxane solids.

Figure 6:
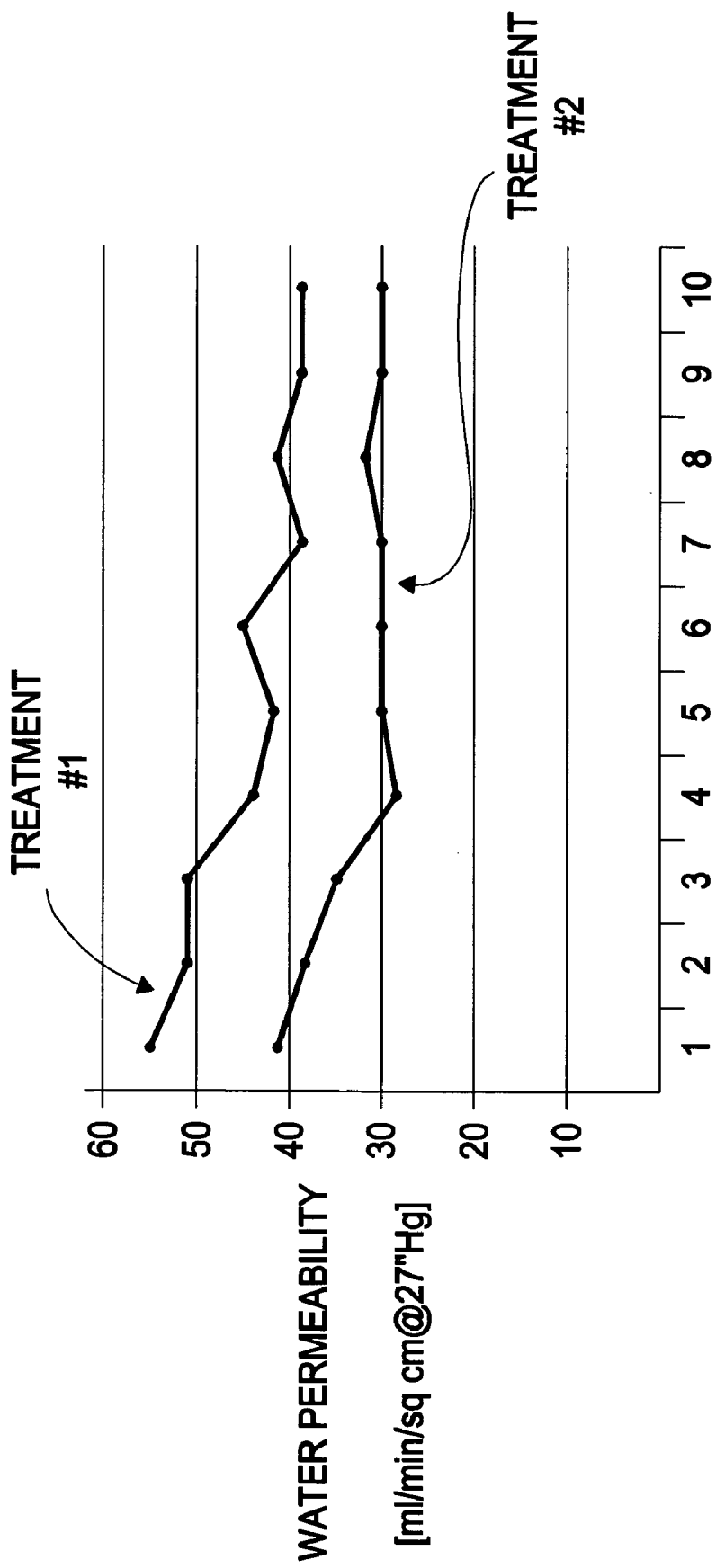
FIG. 6 is a graph illustrating water permeability of two exemplary composite articles.

The composite article was heated to about 200° F. for about 8 minutes to coalesce the solids onto the nodes and fibrils of the treated membrane. Most of the pores in the treated membrane were not "blinded" or closed off. The air permeability after treatment of the composite article was 0.29 CFM per square foot of the composite article. Water permeability of the composite article was then tested at a pressure of about 27 inches of mercury vacuum. FIG. 6 is a graph illustrating water permeability of the composite article throughout ten cycles. Each cycle represents 250 milliliters of water flowing through the composite article followed by drying at about 212° F. As can be seen from FIG. 6, the composite article has a water permeability of at least about 39 milliliters per minute per square centimeter throughout the ten cycles, with any loss of permeability appearing to level off after between 5 or 6 cycles.

TREATMENT EXAMPLE 2

The membrane described above was laminated with a polypropylene material and treated with a diluted and stabilized dispersion of ECM/D6453 to form a composite article. Specifically, a organofunctional siloxane solids dispersion (ECM/D6453, a mixture of about 100% IPA by volume with about 6% organofunctional siloxane solids) was mixed with a hydrophilic activator and IPA to form a coating composition having 1.5 wt % organofunctional siloxane solids.

The composite article was heated to about 200° F. for about 8 minutes to coalesce the solids onto the nodes and fibrils of the treated membrane. Most of the pores in the treated membrane were not "blinded" or closed off. The air permeability after treatment of the composite article was 0.29 CFM per square foot of the composite article. Water permeability of the composite article was then tested at a pressure of about 27 inches of mercury vacuum. FIG. 6 is a graph illustrating water permeability of the composite article throughout ten cycles. Each cycle represents 250 milliliters of water flowing through the composite article followed by drying at about 212° F. As can be seen from FIG. 6, the composite article has a water permeability of at least about 29 milliliters per minute per square centimeter throughout the ten cycles, with any loss of permeability appearing to level off after 4 cycles.

Exemplary embodiments of articles and methods are described and/or illustrated herein in detail. The articles and methods are not limited to the specific embodiments described herein, but rather, components of each article and steps of each method may be utilized independently and separately from other articles and steps described herein. Each article component and method step can also be used in combination with other article components and/or method steps.

When introducing elements of the methods and articles described and/or illustrated herein, including any and all embodiment(s) thereof, the articles "a", "an", "the" and "said" are intended to mean that there are one or more of the elements. The terms "comprising", "including" and "having" are intended to be inclusive and mean that there may be additional elements other than the listed elements.

While the invention has been described in terms of various specific embodiments, those skilled in the art will recognize that the invention can be practiced with modification within the spirit and scope of the claims.

What is claimed is:

1. A composite article comprising:
   a base material;
   a porous membrane laminated with the base material, said porous membrane having hydrophobic properties and comprising at least one of expanded polytetrafluoroethylene, woven polytetrafluoroethylene, and non woven polytetrafluoroethylene; and
   a coating layer formed on at least a portion of said porous membrane, said coating layer having hydrophilic properties and comprising at least one of an organofunctional siloxane and a polyether urethane polymer, wherein said composite article retains water wetability and can be dried and subsequently flow liquid without pre-wetting, and comprises a water permeability of between about 5 and about 60 milliliters per minute per square centimeter at about 27 inches of mercury vacuum.

2. A composite article in accordance with claim 1 wherein said base material comprises a material selected from a group of materials comprising polypropylene, polyethylene, polyester, acrylic, polyphenelene sulfide, aramid, polyimide, glass, and/or polytetrafluoroethylene, said base material being one of woven and non woven.

3. A composite article in accordance with claim 1 wherein said porous membrane comprises a weight of between about 0.05 and about 1 ounce per square yard.

4. A composite article in accordance with claim 3 wherein said porous membrane comprises a weight of between about 0.1 and about 0.5 ounces per square yard.

5. A composite article in accordance with claim 1 wherein said coating layer is formed from a coating composition comprising between about 0.1 and about 10 wt % solids based on the total weight of said coating composition.

6. A composite article in accordance with claim 5 wherein said coating composition comprises between about 1.0 and about 3.0 wt % solids based on the total weight of said coating composition.

7. A composite article in accordance with claim 1 wherein said coating layer is formed from a coating composition comprising a solvent having a surface tension of less than about 31 dynes per centimeter.

8. A composite article in accordance with claim 1 wherein said coating layer is formed from a coating composition comprising at least one solvent selected from a group of solvents comprising water, isopropyl alcohol, ethanol, and acetone.

9. A composite article in accordance with claim 1 wherein said composite article comprises an air permeability of between about 0.01 and about 10 CFM per square foot as measured in accordance with ASTM D737.

10. A composite article in accordance with claim 9 wherein said composite article comprises an air permeability of between about 0.75 and about 2.25 CFM per square foot as measured in accordance with ASTM D737.

11. A composite article in accordance with claim 1 wherein said composite article remains hydrophilic after at least three wet then dry cycles.

12. A composite article in accordance with claim 1 wherein said composite article comprises a water permeability of between about 45 and about 55 milliliters per minute per square centimeter at about 27 inches of mercury vacuum.

13. A composite article in accordance with claim 1 wherein said coating layer is formed from a coating composition comprising a hydrophilic activator.

14. A composite article in accordance with claim 13 wherein said hydrophilic activator comprises ammonium hydroxide.

15. A method of making a composite article having hydrophilic properties, said method comprising:
providing a base material;
providing a porous membrane having hydrophobic properties and comprising a plurality of pores;
laminating the base material with the porous membrane;
mixing at least one of an organofunctional siloxane and a polyether urethane polymer with a solvent and a hydrophilic activator to form a coating composition having hydrophilic properties;
applying a coating of the coating composition onto surfaces defining the pores in the porous membrane after the porous membrane has been laminated with the base material; and
retaining water wetability such that the composite article can be dried and subsequently flow liquid without pre-wetting, wherein the composite article comprises a water permeability of between about 5 and about 60 milliliters per minute per square centimeter at about 27 inches of mercury vacuum.

16. A method in accordance with claim 15 wherein said laminating the base material with the porous membrane comprises laminating the base material with the porous membrane at a temperature greater than about 300° F.

17. A method in accordance with claim 15 wherein said laminating the base material with the porous membrane comprises laminating the base material with the porous membrane at a temperature less than about 300° F.

18. A method in accordance with claim 17 wherein said lamination the base material with the porous membrane comprises applying an adhesive to at least one of the base material and the porous membrane.

19. A method in accordance with claim 15 wherein said applying a coating of a coating composition comprises passing the porous membrane over a roller having the coating composition thereon.

20. A method in accordance with claim 15 further comprising curing the coating composition after the coating composition has been applied to the porous membrane at a temperature equal to or less than about 300° F.

21. A method in accordance with claim 20 wherein said curing the coating composition comprises curing the coating composition at a temperature between about 260° F. and about 280°F.

* * * * *

UNITED STATES PATENT AND TRADEMARK OFFICE
CERTIFICATE OF CORRECTION

PATENT NO. : 7,665,615 B2  Page 1 of 1
APPLICATION NO. : 11/241430
DATED : February 23, 2010
INVENTOR(S) : Olson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 760 days.

Signed and Sealed this

Twenty-eighth Day of December, 2010

David J. Kappos
*Director of the United States Patent and Trademark Office*